(12) United States Patent
Tamura et al.

(10) Patent No.: US 11,966,034 B2
(45) Date of Patent: Apr. 23, 2024

(54) SURGICAL OPTICAL LENS

(71) Applicant: TALEX CO., LTD., Osaka (JP)

(72) Inventors: Shinzo Tamura, Osaka (JP); Kenzo Wada, Osaka (JP)

(73) Assignee: TALEX CO., LTD., Osaka (JP)

( * ) Notice: Subject to any disclaimer, the term of this patent is extended or adjusted under 35 U.S.C. 154(b) by 720 days.

(21) Appl. No.: 16/973,330

(22) PCT Filed: Jun. 13, 2019

(86) PCT No.: PCT/JP2019/023544
§ 371 (c)(1),
(2) Date: Dec. 8, 2020

(87) PCT Pub. No.: WO2020/031502
PCT Pub. Date: Feb. 13, 2020

(65) Prior Publication Data
US 2021/0247599 A1 Aug. 12, 2021

(30) Foreign Application Priority Data

Aug. 8, 2018 (WO) .................. PCT/JP2018/029785

(51) Int. Cl.
*G02B 3/00* (2006.01)
*G02B 5/22* (2006.01)
(Continued)

(52) U.S. Cl.
CPC .......... *G02B 21/0012* (2013.01); *G02B 3/00* (2013.01); *G02B 5/223* (2013.01); *G02B 5/3025* (2013.01); *G02C 7/104* (2013.01); *G02C 7/12* (2013.01)

(58) Field of Classification Search
CPC ...... G02B 21/0012; G02B 3/00; G02B 5/223; G02B 5/3025; G02B 21/0092;
(Continued)

(56) References Cited

U.S. PATENT DOCUMENTS

| 8,210,678 B1 | 7/2012 | Farwig |
| 2002/0126256 A1 | 9/2002 | Larson |

(Continued)

FOREIGN PATENT DOCUMENTS

| EP | 3351583 | 7/2018 |
| JP | 4-93912 | 3/1992 |

(Continued)

OTHER PUBLICATIONS

Extended European Search Report dated Jun. 11, 2021 in corresponding European Patent Application No. 19845955.4.
(Continued)

*Primary Examiner* — Tuyen Tra
(74) *Attorney, Agent, or Firm* — Wenderoth, Lind & Ponack, L.L.P.

(57) ABSTRACT

A body tissue observation lens includes a lens base having an integral polarizing filter. The body tissue observation lens has a 40% or higher average transmittance in a visible light wavelength range of 380 to 780 nm. The body tissue observation lens contains a specific wavelength light absorbing pigment such that the ratio of the minimum transmittance in a wavelength range of 580 to 600 nm to the average transmittance in the visible light wavelength range of 380 to 780 nm is 18 to 50%.

14 Claims, 5 Drawing Sheets

Example 1

(51) Int. Cl.
*G02B 5/30* (2006.01)
*G02B 21/00* (2006.01)
*G02C 7/10* (2006.01)
*G02C 7/12* (2006.01)

(58) Field of Classification Search
CPC .... G02B 27/286; G02B 5/3033; G02C 7/104; G02C 7/12
USPC ............... 351/41, 159.01, 159.6, 159.65
See application file for complete search history.

(56) References Cited

U.S. PATENT DOCUMENTS

| | | | |
|---|---|---|---|
| 2005/0194876 A1 | 9/2005 | Shimada et al. | |
| 2006/0033851 A1 | 2/2006 | Iori et al. | |
| 2012/0041305 A1 | 2/2012 | Grissom et al. | |
| 2015/0355395 A1 | 12/2015 | Kimura et al. | |
| 2018/0339474 A1* | 11/2018 | Goto | B29D 11/00644 |
| 2018/0341121 A1 | 11/2018 | Goto et al. | |
| 2020/0283662 A1 | 9/2020 | Mori et al. | |

FOREIGN PATENT DOCUMENTS

| | | |
|---|---|---|
| JP | 2005-279255 | 10/2005 |
| JP | 2008-134618 | 6/2008 |
| JP | 2012-173704 | 9/2012 |
| JP | 2015-178002 | 10/2015 |
| WO | 2014/115705 | 7/2014 |
| WO | 2018/003998 | 1/2018 |
| WO | 2018/025508 | 2/2018 |
| WO | 2018/105593 | 6/2018 |

OTHER PUBLICATIONS

English Translation of International Preliminary Report on Patentability and Written Opinion dated Dec. 11, 2020 in corresponding International (PCT) Application No. PCT/JP2019/023544.
International Search Report dated Sep. 3, 2019 in International (PCT) Application No. PCT/JP2019/023544.

* cited by examiner

SURGICAL OPTICAL LENS

TECHNICAL FIELD

The present invention relates to a surgical spectacle lens used by a surgeon or any other personnel to observe a body tissue, and a surgical optical lens used, e.g., in a surgical microscope.

BACKGROUND ART

Lenses for polarized spectacles that are supposed to be used in environments where illumination is high and reflected light is abundant—such as outdoors—include a polarizing filter capable of cutting or attenuating light in a particular wavelength range that causes glare, thus preventing fatigue of the eyes due to glare of reflected light.

For example, polarized lenses for spectacles are known which include a polarizing element of which the transmittance of visible light of 380 to 780 nm is 30% or more ("MO'EYE LENS": registered trademark, by TALEX). Such spectacle lenses can be worn in an ordinary daily life because they provide enough brightness while maintaining necessary polarizing function to a certain degree.

On the other hand, known spectacles used for surgery include a microscope for microsurgery which allows surgery on a body tissue while observing the body tissue by enlarging it; and a surgical microscope with a polarizing means which divides the optical path to direct polarized light components that are different in oscillating directions from each other, into the right and left eyes of the user, thereby allowing the user to three-dimensionally observe the body part to be operated JP H4-93912 A).

Also, as a system for visualizing lymphatic tissues and blood vessels of a body tissue, a system using surgical spectacles is known in which a fluorescent, phosphorescent or luminescent dye is injected into the body tissue to be operated, and a portion of the light excited by stimulating the dye that has specific wavelengths is removed with an optical filter capable of removing, blocking, absorbing, reflecting or deflecting such light so that the body part to be operated can be seen more clearly (JP 2015-178002 A).

SUMMARY OF THE INVENTION

Object of the Invention

In the surgical spectacle lenses described in JP 2015-178002 A, when observing a body tissue with the light excited from a luminescent dye, the polarizing filter removes stimulating light. However, JP 2015-178002 A is silent about polarizing properties that improve visibility of the body tissue during ordinary surgery in which no luminescent dye is used.

On the other hand, JP H4-93912 A discloses spectacles including polarized lenses in order to allow the user to three-dimensionally observe the body part to be operated. However, because this is done by displaying 3-D images on a monitor of the microscope, it is impossible to directly identify, through the spectacles, bleeding at a specific location of the body part such as at a blood vessel or a body tissue.

Thus, any of the above-described surgical spectacle lenses does not enable accurate identification of the boundary between blood in blood vessels and bleeding out of blood vessels, under ordinary illumination in an operating room.

An object of the present invention is to provide a surgical optical lens used to observe a body tissue which is free of the above-described problems, which enables, under ordinary illumination in an operating room, identification of blood that has bled out of capillary vessels into the body tissue, i.e., identification of locations where micro-bleeding has occurred, so that this lens can be advantageously used for surgical spectacles or a surgical microscope.

Means for Achieving the Object

In order to achieve this object, the present invention provides, for a surgical optical lens used under illumination in an operating room, a surgical optical lens which is a polarized lens comprising a lens base and a polarizing filter integral with the lens base, wherein an average transmittance of the polarized lens in a visible light wavelength range of 380 to 780 nm is 40% or more, and wherein either the lens base or any layer that is integral with the lens base contains a specific wavelength light absorbing pigment such that a ratio of a minimum transmittance in a wavelength range of 580 to 600 nm to the average transmittance in the visible light wavelength range of 380 to 780 nm is 18 to 50%.

Because the surgical optical lens according to the present invention includes a polarizing filter and a lens base that are integral with each other, with the surface of the body tissue wetted with body fluid present in cells, the polarizing filter is capable of cutting undesirable light including irregular reflection from the indoor illuminating light, so that the surgical optical lens of the invention provides clean view of the surface of the body tissue without reflective light, thus allowing clear and detailed observation of capillary vessels and surrounding tissues.

In order to maximize the transmittance of the spectacle lens in the visible light wavelength range of 380 to 780 nm, thereby providing a clear and bright view, while cutting scattered light to some extent, thereby improving the contrast, the polarized lens has preferably a degree of polarization of 15 to 40%.

Because the average transmittance of the polarized lens in a visible light wavelength range of 380 to 780 nm is 40% or more (throughout the specification, percentage values are values rounded at the first decimal place), even when the above-described polarizing filter is used, the lens provides a bright vision and the definition improves.

If the above transmittance of the spectacle lens is too low, i.e., lower than the above-described range, it will become difficult to visually identify the contours of capillary vessels in a body tissue and the amount and the color of blood leaking from capillary vessels. On the other hand, if the transmittance is too high, the polarizing filter may be unable to sufficiently cut undesirable light including reflected light, which could also make it difficult to identify, e.g., the contours of capillary vessels. In order to minimize these possibilities, the average transmittance in the visible light wavelength range of 380 to 780 nm is preferably 45 to 75%, more preferably 50 to 75%.

Because the surgical optical lens according to the present invention contains a contains a specific wavelength light absorbing pigment such that the ratio of a minimum transmittance in a wavelength range of 580 to 600 nm to the average transmittance in the visible light wavelength range of 380 to 780 nm is 18 to 50%, the transmittance of yellowish light having wavelengths of 580 to 600 nm is limited to the above-defined ratio. This optical lens therefore selectively transmit orange to red light and green light, so that the wearer of this lens is capable of strongly perceive especially the contrast between orange and red colors and other colors including green, and is thus capable of clearly identifying the boundary between the blood color, which is orange or red, and other colors.

Thus, the optical lens according to the present invention allows the wearer to clearly visually identify blood leaking out of blood vessels into the body tissue, and thus is suitable for use in spectacles for medical use, especially for surgical spectacles because such spectacles allows the wearer to extremely easily identify micro-bleeding.

If the above-defined ratio of the minimum transmittance in the wavelength range of 580 to 600 nm is lower than the lower limit of the above-defined range (18%), while the contrast is high, the vision tends to be so clear as to fatigue the eyes of the wearer, and also, yellowish colors, which give brightness, tend to fade, thus darkening the vision, and making it, actually, difficult to identify a body tissue and thin blood vessels.

If the above-defined ratio of the minimum transmittance is higher than the upper limit of the above-defined range (50%), the contrast between orange and red colors and other colors drops, so that, while such a lens is gentle to, and less likely to fatigue, the eyes of the wearer, it is difficult to clearly observe the details of capillary vessels and surrounding tissues.

For the above-described reasons, the above-defined ratio of the minimum transmittance in the wavelength range of 580 to 600 nm should be 18 to 50%, preferably 20 to 50%, more preferably 30 to 50%.

Because the surgical optical lens according to the present invention is not intended for spectacles used in an ordinary life, the lens of the present invention does not need to meet JIS and other international standards in terms of transmittance intended for ordinary spectacle lenses.

Specific wavelength light absorbing pigments capable of adjusting the ratio of the minimum transmittance in the wavelength range of 580 to 600 nm include, typically, a tetraazaporphyrin compound. This compound is preferable because its main absorption peak is within the range of 565 to 605 nm.

Surgical spectacles prepared by fitting such surgical optical lenses to a frame allow the wearer to easily identify blood leaking from blood vessels into a body tissue, i.e., identify bleeding regions.

Advantages of the Invention

According to the present invention, in a spectacle lens of which the degree of polarization is weak, the rate of transmittance in the visible light wavelength range is higher than a predetermined level, and the transmittance in the wavelength range of 580 to 600 nm is limited to the above-defined range by adding a specific wavelength light absorbing pigment. The present invention is thus applicable to a surgical optical lens which can be used for spectacles for medical use, especially surgical spectacles which allow the wearer to identify blood leaking from blood vessels into the body tissue, i.e., the bleeding regions, thereby enabling detection of micro-bleeding, or applicable to such surgical spectacles.

EMBODIMENTS OF THE INVENTION

Figure 1:
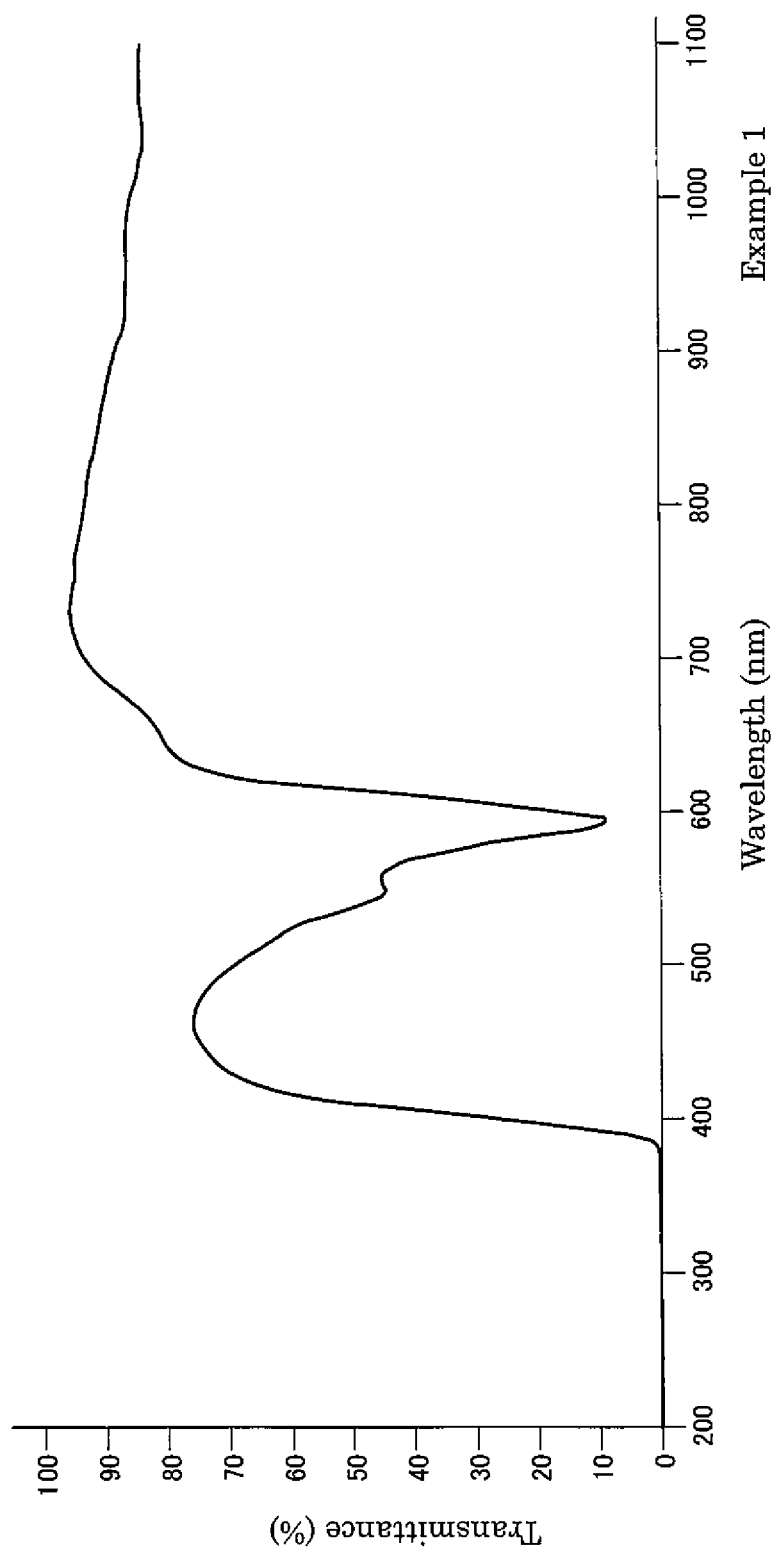
FIG. 1 is a spectral chart of Example 1, showing the relationship between the wavelength and the transmittance.

A surgical optical lens embodying the present invention includes a spectacle lens base integrally provided with a polarizing filter such that the average transmittance of visible light having wavelengths of 380 to 780 nm is 40% or more.

The polarizing filter is obtained as a polarizing film with a well-known process, and is preferably obtained by adding, to a film of polyvinyl alcohol (PVA), iodine or an iodine compound by, e.g., impregnation, further adding, as necessary, a dye, and monoaxially stretching the film.

The material of the polarizing film is not limited to PVA, and the polarizing film may be a composite film comprising a polyethylene terephthalate (PET) or PVA film to which a film made of, e.g., triacetyl cellulose or polycarbonate is laminated.

The monoaxially stretched polarizing film, made of, e.g. PVA, is cut to the size of the lens (which is a meniscus lens), a spherical curved surface is formed on the polarizing film with a known pressing method such that the curved surface extends along the curve (radius of curvature) of the lens, and the polarizing film is subjected to insert molding together with the lens base in a lens-forming mold.

As the polarizing film, selecting a violetish polarizing film which is dyed blue-purple, purple, or red-purple is preferable to selecting a grayish or brownish polarizing film. This is because the spectral chart of such a violetish polarizing film has, of the wavelength range of 600 nm or less, a minimum value of transmittance at around 595 nm, which means that such a film cuts green and yellow light, thus allowing the user to more clearly see long-wavelength light such as orange and red colors.

When dying the polarizing film used in the present invention, the polarizing film may be formed into a gray film by using only iodine without adding a dye. Then, the thus-obtained gray polarizing film is, as needed, colored by adding a dye. For example, if a reddish or yellowish dye is added to the polarizing film containing iodine, a brownish film is obtained, and the addition of a purplish dye will result in a violetish film.

Dyes usable in forming the polarizing film are water-soluble dyes. More particularly, such dyes include basic dyes, acid dyes, direct dyes, acid mordant dyes and soluble vat dyes, but any other known dyes are also usable.

Specific water-soluble dyes include Black GGN, Violet BBN, Blue BGR, Brown 5GS, Green 3GSN, Red G3B, and Yellow GC.

In selecting among violetish (V), grayish (G) and brownish (B) polarizing filters, their respective absorption properties can be evaluated by the ratio of maximum transmittance to minimum transmittance in the wavelength range of 280 to 495 nm (property evaluation ratio).

TABLE 1

| Color | Wavelength at maximum transmittance (nm) | Maximum transmittance (%) | Evaluation ratio |
| --- | --- | --- | --- |
| Violetish | 460 | 74.3-76.0 | 8.6-12.0 |
| Grayish | 480 | 70.2-72.0 | 8.2-10.7 |
| Brownish | 495 | 61.5-62.1 | 6.9-8.9 |

As shown in Table 1, the property evaluation ratio, which indicates how clearly long-wavelength light such as orange and red light can be seen, is the highest for the violetish filter, followed by the grayish filter, and the lowest for the brownish filter. Thus, by using a violetish polarizing film in the surgical optical lens, too, the effect of adding the above-described specific wavelength light absorbing pigment to the above-described lens base is enhanced, so that it becomes easier to identify orange and red blood colors.

The material forming the lens base may be either synthetic resin or inorganic glass, and as needed, an adhesive layer or a coating layer may be provided integrally with the lens base.

The synthetic resin forming the lens base is selectable from among various resins which can be formed by casting into optical lenses such as spectacle lenses. Examples of such synthetic resins include, as thermoplastic resins, MMA (methyl methacrylate resin), and PC (polycarbonate resin), both of which have excellent transparency; as a typical cast type thermosetting resin, CR-39; and as other typical cast type thermosetting resins, medium refractive index resins (such as Corporex from NOF Corporation; refractive index: 1.56, containing allyl diglycol carbonate as its component), and thiourethane resin and urethane resin, which are known high refraction index resins obtained by chemically bonding together isocyanate and polythiol (such high refraction index resins including thiourethane-based resin MR-7 from Mitsui Chemicals; refractive index: 1.67).

In order to add a specific wavelength light absorbing pigment to the lens base or a layer integral with the lens base such that the minimum transmittance in the wavelength range of 580 to 600 nm will be 18 to 50% of the average transmittance in the visible light wavelength range of 380 to 780 nm, an organic-based pigment containing, e.g., a tetraazaporphyrin compound is added to the lens material, to an adhesive used for inter-layer bonding, or to a coating material on the surface of the lens or a layer, and further, as a polymerization initiator, a peroxyester-based or peroxyketal-based peroxide having a 10-hour half-life temperature of 90 to 110° C. is added.

Typical polymerization methods used when forming a plastic lens using as the lens material, e.g., ethylene glycol bis allyl carbonate, include, for example, cast polymerization.

In order to prepare the lens base with cast polymerization, a resin raw material composition comprising a resin lens material, an organic-based pigment, and other necessary additives is poured into a lens-casting mold including two glass or metal mold parts arranged via a gasket or a tape, polymerized and hardened under predetermined polymerizing conditions, and then released from the glass or metal mold parts to obtain a hardened plastic lens base.

For polymerization and hardening, after pouring the composition into the lens-casting mold, the lens-casting mold is heated in an oven or in water for several hours to several tens of hours under a predetermined temperature program to polymerize and harden the composition, thereby forming a spectacle lens.

A tetraazaporphyrin compound, a typical specific wavelength light absorbing pigment used in the present invention, is a well-known compound represented by the following Chemical Formula 1. Commercial versions of the specific tetraazaporphyrin compound represented by the following Chemical Formula 2 include PD-311S from Yamamoto Chemicals Inc., and TAP-2 and TAP-9 both from Yamada Chemical Co., Ltd.

[Chemical Formula 1]

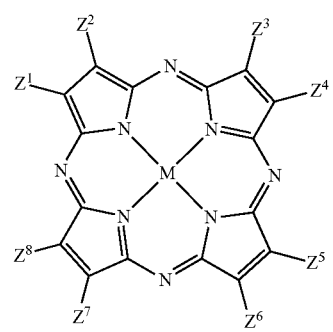

[In Chemical Formula 1, each of $Z^1$ to $Z^8$ represents one of a hydrogen atom, a halogen atom, a nitro group, a cyano group, a hydroxy group, an amino group, a carboxyl group, a sulfonate group, a straight chain having 1 to 20 carbon atoms, a branched or cyclic alkyl group, an alkoxyl group having 1 to 20 carbon atoms, an aryloxy group having 6 to 20 carbon atoms, a monoalkylamino group having 1 to 20 carbon atoms, a dialkylamino group having 2 to 20 carbon atoms, a dialkylamino group having 7 to 20 carbon atoms, an aralkyl group having 7 to 20 carbon atoms, an aryl group having 6 to 20 carbon atoms, a heteroaryl group, an alkylthio group having 6 to 20 carbon atoms, and an arylthio group having 6 to 20 carbon atoms. Otherwise, each of $Z^1$ to $Z^8$ may be a ring, other than an aromatic ring, formed by linking the above-mentioned atoms or groups via linking groups. M denotes two hydrogen atoms, a divalent metallic atom, divalent monosubstituted metallic atom, a tetravalent disubstituted metallic atom, or an oxy metallic atom.]

[Chemical Formula 2]

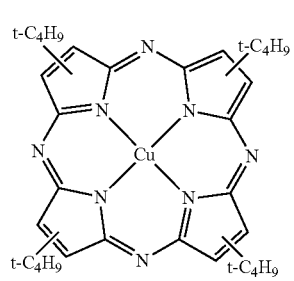

[In Chemical Formula 2, Cu denotes divalent copper, and $C_4H_9$ (t) denotes a tertiary butyl group. Thus, Chemical Formula 2 illustrates a positional isomer structure in which one of $Z^1$ and $Z^2$, one of $Z^3$ and $Z^4$, one of $Z^5$ and $Z^6$, and one of $Z^7$ and $Z^8$ are substituted by the four substituent groups, respectively.]

The polymerization initiator used in the present invention is a peroxyester-based or peroxyketal-based peroxide having a 10-hour half-life temperature of 90 to 110° C.

Specific examples of such peroxyester-based peroxides include t-hexyl peroxybenzoate, t-butyl peroxybenzoate, t-hexyl peroxy isopropyl monocarbonate, and t-butyl peroxyacetate. The peroxyketal-based peroxide may be 1,1-di(t-butyl peroxy)cyclohexane.

By using such a polymerization initiator, even if the optical lens is made of allyl diglycol carbonate resin containing a tetraazaporphyrin compound as a pigment, the tetraazaporphyrin compound sufficiently reveals its properties as a pigment such that the optical lens has a main absorption peak of the transmittance of visible light in the wavelength range of 565 nm to 605 nm, and the absorption rate at absorption peak is sufficiently low (which means the transmittance at the peak is sufficiently low).

The surgical optical lens according to the present invention may be subjected to hard coating treatment. For example, by immersing the lens in a solution containing a silicon-based compound, a hard film forms on the lens, which increases the surface hardness of the lens. It is also possible to further improve the lens performance by subjecting the lens to antifogging treatment, antireflective treatment, chemical-resistant treatment, antistatic treatment, and/or mirror treatment.

EXAMPLES

Example 1

3 parts by mass of a polymerization initiator (trade name: PERBUTYL Z from NOF Corporation) was added to 100 parts by mass of a monomer of ethylene glycol bis allyl carbonate (trade name: CR39), and an organic pigment having absorptivity in the wavelength range of 580 to 600 nm (PD-311S from Yamamoto Chemicals; maximum absorption wavelength: 585 nm) was further added by 0.0056 parts by mass, to obtain a lens forming resin material.

The polarizing film was prepared by adding, e.g., by impregnation, a water-soluble dye (violet) to a polyvinyl alcohol (PVA) film, and mono-axially stretching the film.

The polarizing film, circular in shape, had its peripheral edge portion engaged with a side of an annular protrusion on an inner peripheral surface of a cylindrical gasket made of a silicone resin, and an engaging ring was pushed into and engaged with the inner peripheral surface of the gasket so as to be superposed on the peripheral edge portion of the polarizing film, thereby sandwiching the peripheral edge portion between the engaging ring and the annular protrusion.

With the polarizing film held by the gasket in this way, the gasket was placed between a pair of molds for forming a surgical spectacle lens having opposed convex and concave surfaces, and liquid-tightly fitted to the molds to define cavities by suitably distancing the polarizing film from the molds. The above-described lens forming resin material was then deaerated and poured into the cavities, heated to 100° C. and hardened, and slowly cooled thereafter. Then, upon completion of the entire process, which took 48 hours, the hardened resin material was released from the molds as the surgical optical lens according to the present invention.

For the thus-obtained surgical optical lens, the spectral transmittance was measured using U-2000 spectrophotometer from Hitachi. FIG. 1 shows the relationship between the wavelength (nm) and the transmittance (%), as measured.

Table 2 shows, for the lens base of Example 1, the spectral transmittance values at wavelengths 600, 595, 590, 585 and 580 nm, and the average spectral transmittance in the wavelength range of 380 to 780 nm. Table 2 also shows, for the lens base of Example 1, the ratio in percentage of the minimum transmittance A in the wavelength range of 580 to 600 nm to the average transmittance at the visible light wavelength range of 380 to 780 nm (i.e., ratio A/B in percent), this ratio indicating the contrast characteristics. This ratio is calculated by substituting the measured values in Table 2 into the below mathematical formula (1), and its value 18.80 [%] is shown in Table 2.

$(A/B) \cdot 100[\%] = $ (Minimum transmittance in wavelength range of 580-600 nm/Average spectral transmittance in wavelength range of 380-780 nm)$\cdot 100$     Mathematical Formula (1):

TABLE 2

| Item | No. | Example 1 | Example 2 | Example 3 | Example 4 |
|---|---|---|---|---|---|
| Color of polarizing film | | Violetish | Grayish | Brownish | Violetish |
| Spectral transmittance | 600 nm | 12.12 | 11.83 | 12.09 | 32.7 |
| | 595 nm (minimum) | 8.88 | 8.87 | 8.89 | 29.07 |
| | 590 nm | 9.88 | 9.73 | 9.95 | 31.19 |
| | 585 nm | 16.24 | 15.99 | 16.35 | 39.54 |
| | 580 nm | 27.60 | 27.48 | 28.10 | 50.10 |
| | Ave. of 380-780 nm | 47.23 | 46.70 | 46.51 | 71.58 |
| (A/B) – 100 [%] | | 18.80 | 18.99 | 19.11 | 40.61 |

Example 2

A surgical optical lens was manufactured in exactly the same manner as in Example 1 except that as the polarizing film, a grayish polarizing film was used which was formed by adding iodine to a polyvinyl alcohol (PVA) film, e.g. by impregnation, and monoaxially stretching the film.

Figure 2:
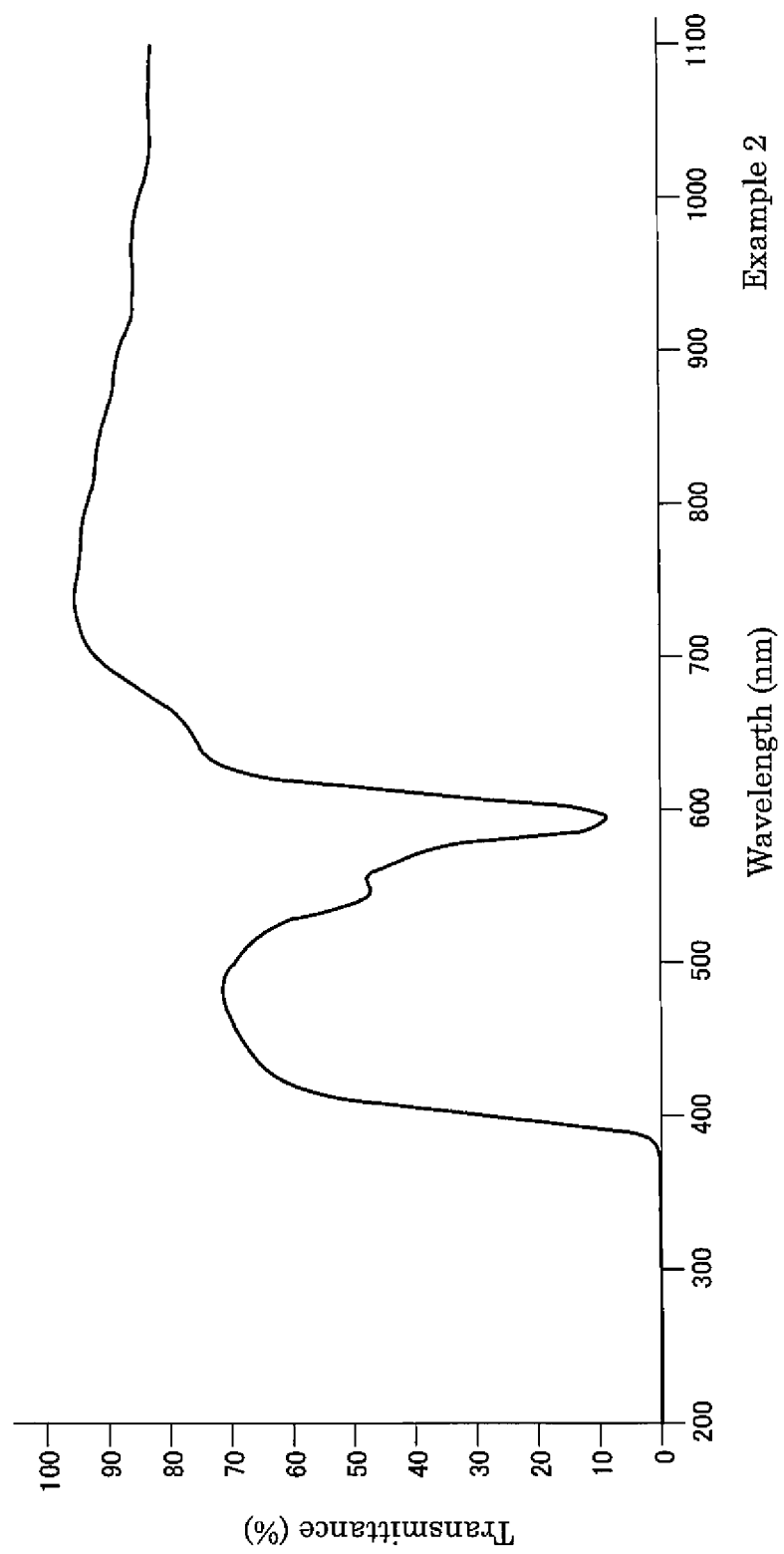
FIG. 2 is a spectral chart of Example 2, showing the relationship between the wavelength and the transmittance.

For the surgical optical lens obtained, the spectral transmittance was measured in the same manner as in Example 1, the relationship between the wavelength and the transmittance (spectral transmittance curve) is shown in FIG. 2, and the measured values and the like are shown in Table 2. The value (A/B)·100 [%] of Formula (1), of this lens, was 18.99, and thus, the surgical spectacles of this example showed, as in Example 1, excellent contrast characteristics.

Example 3

A surgical optical lens was manufactured in exactly the same manner as in Example 1 except that as the polarizing film, a brownish polarizing film was used which was formed by adding a water-soluble (reddish) dye to a polyvinyl alcohol (PVA) film, e.g. by impregnation, and monoaxially stretching the film.

Figure 3:
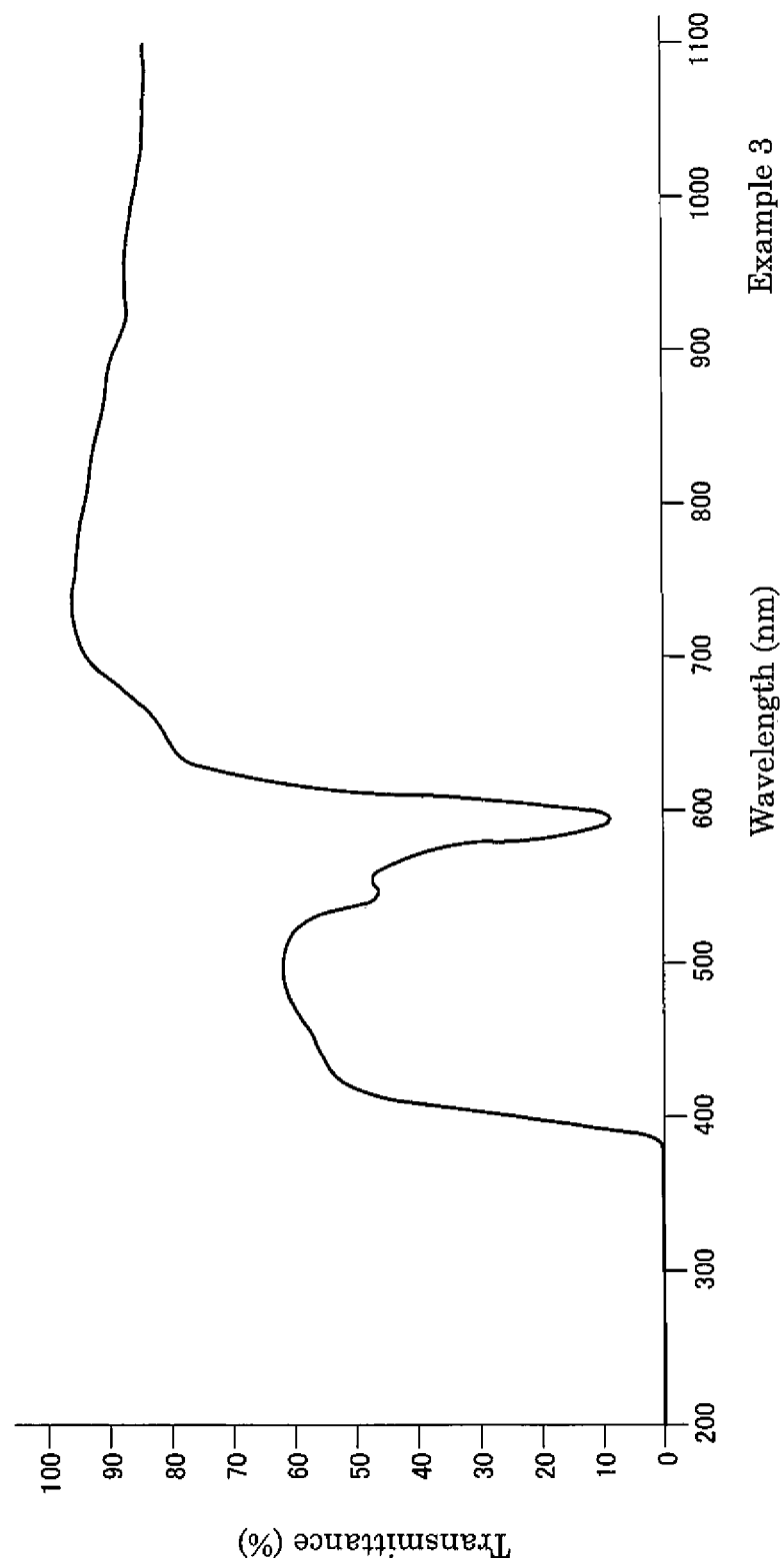
FIG. 3 is a spectral chart of Example 3, showing the relationship between the wavelength and the transmittance.

For the surgical optical lens obtained, the spectral transmittance was measured in the same manner as in Example 1, the relationship between the wavelength and the transmittance (spectral transmittance curve) is shown in FIG. 3, and the measured values and the like are shown in Table 2. The value of (A/B)·100 [%] of Formula (1) of this lens was 19.11, and thus, the surgical spectacles of this example showed, as in Example 1, excellent contrast characteristics.

Example 4

A surgical optical lens was manufactured in exactly the same manner as in Example 1 except that, instead of adding 0.0056 parts by mass of an organic pigment (PD-311S from Yamamoto Chemicals; maximum absorption wavelength: 585 nm), the same organic pigment was added by 0.0040 parts by mass.

Figure 4:
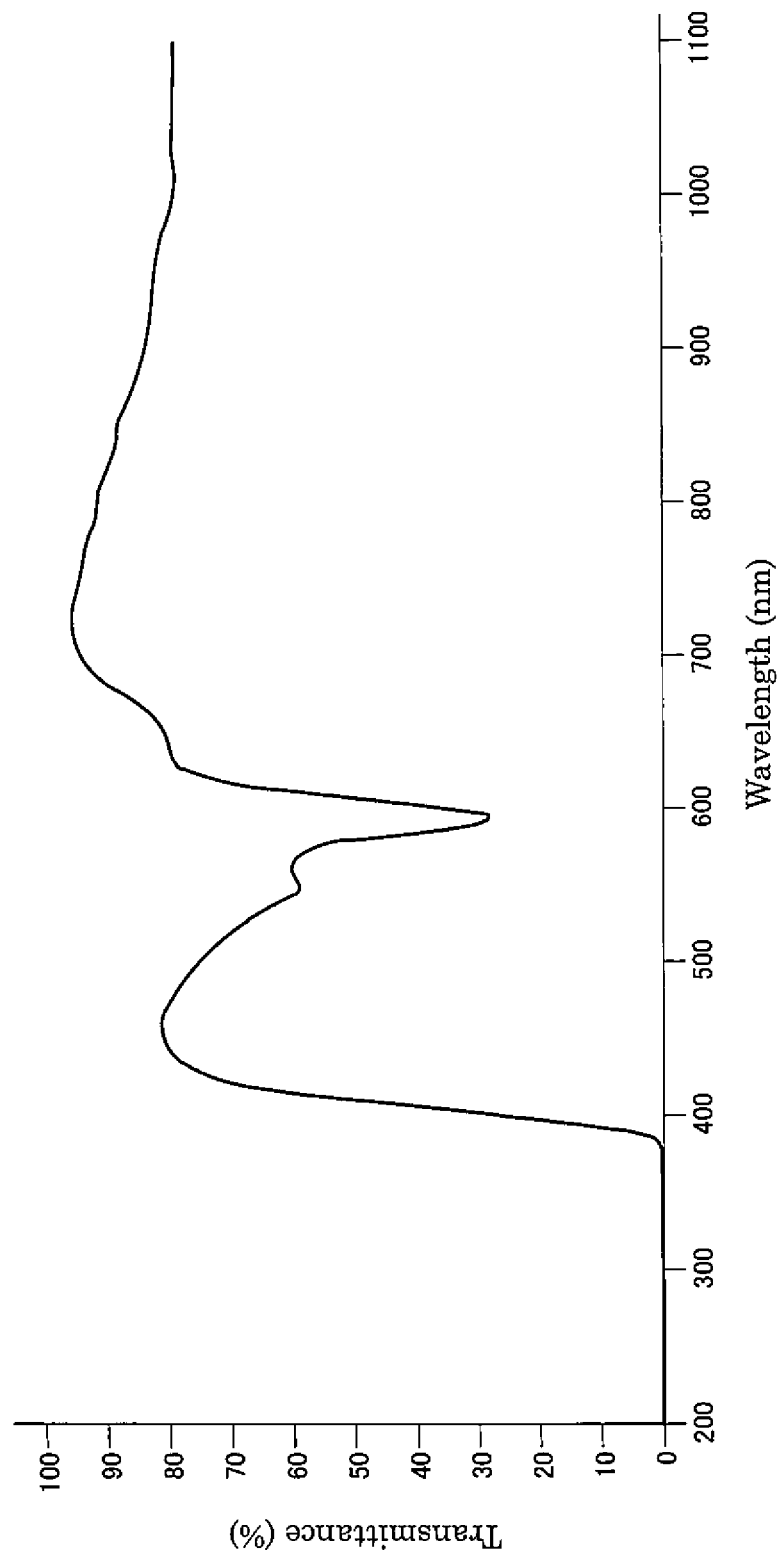
FIG. 4 is a spectral chart of Example 4, showing the relationship between the wavelength and the transmittance.

For the surgical optical lens obtained, the spectral transmittance was measured in the same manner as in Example 1, the relationship between the wavelength and the transmittance (spectral transmittance curve) is shown in FIG. 4, and the measured values and the like are shown in Table 2. The value of (A/B)·100 [%] of Formula (1) of this lens was 40.61, and thus, the surgical spectacles of this example showed, as in Example 1, excellent contrast characteristics.

Medical personnel were asked to wear, during surgery, spectacles having the surgical optical lenses of Examples 1-4 mounted on the spectacle frame, and they were asked how easily bleeding from very small blood vessels was detectable through these lenses during surgery.

More than half of them said that they were able to extremely clearly identify bleeding from very small blood vessels of 1 mm or less in diameter in the human body tissue. Thus, the lenses of Examples 1-4 were found out to be advantageously usable for spectacles for medical use such as for surgery.

Reference Example 1

An optical lens (Reference Example 1) was manufactured in exactly the same manner as in Example 1 except that no polarizing film was used, and that a lens forming resin material was used to which 0.0074 part by mass of an organic pigment having absorptivity in the wavelength range of 580 to 600 nm (PD-311S from Yamamoto Chemicals; maximum absorption wavelength: 585 nm) was added.

Figure 5:
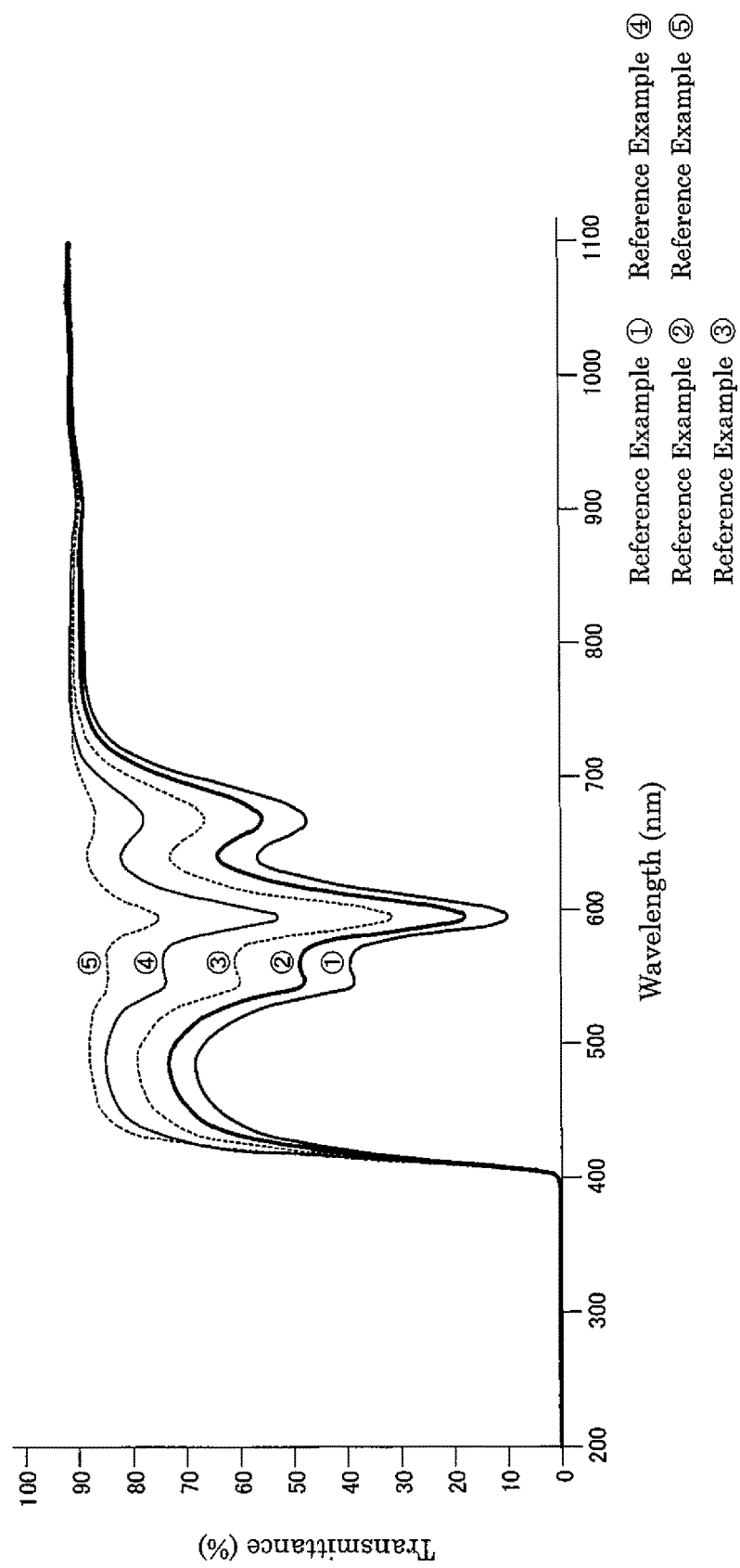
FIG. 5 is a spectral chart of Reference Examples 1-5, showing the relationship between the wavelength and the transmittance.

For the surgical optical lens obtained, the spectral transmittance was measured in the same manner as in Example 1, and the values of the Lab color system were measured. These measured values are shown in Tables 3 and 4, and the relationship between the wavelength and the transmittance (spectral transmittance curve) is shown in FIG. 5. The value of (A/B)·100 [%] of Formula (1) of this lens was 19.25. Although Reference Example 1 is an optical lens not including a polarizing film, Reference Example 1 can be used to determine the content of the specific wavelength light absorbing pigment to achieve the target contrast characteristics. Although Reference Example 1 showed good contrast characteristics, if a polarizing film is integrally provided, the vision could become slightly too dark.

Reference Example 2

An optical lens (Reference Example 2) was manufactured in exactly the same manner as in Example 1 except that no polarizing film was used.

For the surgical optical lens obtained, the spectral transmittance was measured in the same manner as in Reference Example 1, and the values of the Lab color system were also measured. The relationship between the wavelength and the transmittance (spectral transmittance curve) is shown in FIG. 5, and the measured values are shown in Tables 3 and 4. The value of (A/B)·100 [%] of Formula (1) of this lens was 30.99, which indicates that the content of the specific wavelength light absorbing pigment of Reference Example 2 is suitable as the lens of Example 1 without the polarizing film to achieve the contrast characteristics of Example 1.

Reference Examples 3-5

Optical lenses of Reference Examples 3-5 were manufactured in exactly the same manner as in Reference Example 1 except that, to 100 parts by mass of the lens forming resin material, an organic pigment having absorptivity in the wavelength range of 580 to 600 nm (PD-331S from Yamamoto Chemicals; maximum absorption wavelength: 585 nm) was added by 0.0037 parts by mass (Reference Example 3), 0.0019 parts by mass (Reference Example 4), and 0.0007 parts by mass (Reference Example 5).

For the surgical optical lenses obtained, the spectral transmittance was measured in the same manner as in Reference Example 1, and the values of the Lab color system were also measured. The relationship between the wavelength and the transmittance (spectral transmittance curve) is shown in FIG. 5, and the measured values are shown in Tables 3 and 4.

The values of (A/B)·100 [%] of Formula (1) of these lenses were 48.65, 72.58 and 95.73, respectively. These values can be taken into consideration in determining the content of the specific wavelength light absorbing pigment in an optical lens not including a polarizing film to achieve the target contrast characteristics.

In particular, the content of the specific wavelength light absorbing pigment of Reference Example 3 is considered to be appropriate in obtaining contrast characteristics comparable to those of Example 1. For Reference Examples 4 and 5, the average spectral transmittance in the wavelength range of 380 to 780 nm exceeded 70%, and thus, even if the polarizing film is integrally disposed, such a polarizing filter may be unable to sufficiently cut undesirable light including reflected light, if the degree of polarization of the filter is adjusted to a low level.

TABLE 3

| Item | | Reference Example (no polarizing filter) No. | | | | |
|---|---|---|---|---|---|---|
| | | 1 | 2 | 3 | 4 | 5 |
| Content of specific wavelength light absorbing pigment (parts by mass) | | 0.0074 | 0.0056 | 0.0037 | 0.0019 | 0.0007 |
| Spectral transmittance | 600 nm | 11.27 | 19.48 | 33.51 | 54.47 | 75.78 |
| | 595 nm | 10.05 | 17.89 | 31.58 | 52.71 | 74.86 |
| | 590 nm | 12.95 | 21.48 | 35.53 | 56.02 | 76.50 |
| | 585 nm | 20.38 | 29.92 | 44.16 | 62.79 | 79.66 |
| | 580 nm | 29.80 | 39.61 | 53.18 | 69.24 | 82.48 |
| | Ave. of 380-780 nm | 52.20 | 57.72 | 64.91 | 72.62 | 78.20 |
| (A/B) · 100 [%] | | 19.25 | 30.99 | 48.65 | 72.58 | 95.73 |

TABLE 4

| No. | Value | Value of Lab color system | | | |
|---|---|---|---|---|---|
| | | Value Y | Value L | Value a | Value b |
| Reference Example | 1 | 42.53 | 65.21 | −1.90 | −20.26 |
| | 2 | 51.24 | 71.59 | −2.59 | −15.35 |
| | 3 | 61.95 | 78.71 | −2.89 | −9.47 |
| | 4 | 74.54 | 86.34 | −2.67 | −3.71 |
| | 5 | 85.52 | 92.47 | −2.28 | 1.41 |

Example 5

An optical lens integrally including a polarizing film to have red-enhancing polarizing properties was obtained in exactly the same manner as in Example 1, except that the lens forming resin material was prepared by mixing, in equivalence ratio, a prepolymer obtained by reacting a polyisocyanate as a polyurethane material with a hydroxy compound, and as a curing agent, MOCA or 4,4'-methylenebis(2-chloroanyline), and further by adding 0.0040 part of TAP-2 from Yamada Chemical Co., Ltd. (maximum absorption wavelength: 595 nm).

For the surgical optical lens obtained, in the same manner as the measurement of the spectral transmittance of Example 1, the spectral transmittance values at wavelengths 600, 595, 590, 585 and 580 nm were measured, and the average spectral transmittance in the wavelength range of 380 to 780 nm was calculated. The measured spectral transmittance values were nearly the same as those in Example 1, and thus it was discovered that the surgical spectacles of this Example had excellent contrast characteristics comparable to those of Example 1.

Example 6

A surgical optical lens having a polarizing film integrally provided, and having red-enhancing polarizing properties and high refractiveness was obtained in the same manner as in Example 1, except that as the material of the lens base, a thiourethane resin (MR20 from Mitsui Chemicals) was used instead of ethylene glycol bis allyl carbonate, and to 100 parts of the thiourethane resin, 0.0040 part of an organic pigment (TAP-2 from Yamada Chemicals (maximum absorption wavelength: 5957 nm) was added, to obtain the lens base.

In the same manner as above, the spectral transmittance values at wavelengths 600, 595, 590, 585 and 580 nm were measured, and the average spectral transmittance in the wavelength range of 380 to 780 nm was calculated. The measured spectral transmittance values were nearly the same as those in Example 1, and thus it was discovered that the surgical spectacles of this Example had excellent contrast characteristics comparable to those of Example 1.

Example 7

An adhesive was applied to opposed surfaces of two glass lens bases to form two adhesive layers, and the polarizing film used in Example 1 was inserted between and laminated on the two adhesive layers. The adhesive layers contained 0.0080 part of an organic pigment having absorptivity in the wavelength range of 580 to 600 nm (PD-331S from Yamamoto Chemicals; maximum absorption wavelength: 585 nm). The surgical optical lens thus obtained, of which the entire layers are integral due to the above-described lamination, had red-enhancing polarizing properties.

In the same manner as above, the spectral transmittance values at wavelengths 600, 595, 590, 585 and 580 nm were measured, and the average spectral transmittance in the wavelength range of 380 to 780 nm was calculated. The measured spectral transmittance values were nearly the same as those in Example 1, and thus it was discovered that the surgical spectacles of this Example had excellent contrast characteristics comparable to those of Example 1.

Comparative Example 1

An optical lens was manufactured in exactly the same manner as in Example 1 except that a polarizing film of which the degree of polarization was 99% or more.

The average transmittance of the optical lens obtained was low, i.e., about 35%, and it is apparent that if this optical lens is used as a surgical optical lens, it would be difficult to distinguish between darkness and brightness of the area to be operated because of the low transmittance in the visible light wavelength range.

Comparative Example 2

A lens having red-enhancing polarizing properties was manufactured by adding, as an organic dye, 0.0080 part of TAP-2 from Yamada Chemical Co., Ltd. (maximum absorption wavelength: 595 nm), to a mixture, in equivalence ratio, of a polyurethane prepolymer and MOCA. The average transmittance of this lens in the visible light wavelength range of 380 to 780 nm 15%.

Thus, it is apparent that if this optical lens is used as a surgical optical lens, it would be difficult to distinguish between dark and bright colors of the area to be operated because of the low transmittance in the visible light wavelength range.

Comparative Example 3

An optical lens was prepared without using a polarizing film, and by adding only an organic pigment having absorptivity in the wavelength range of 580 to 600 nm (PD-331S from Yamamoto Chemicals; maximum absorption wavelength: 585 nm).

This optical lens is unable to remove reflective light and stimulating light under surgical illumination, and does not allow distinction between subtle brightness and darkness.

As will be apparent from the results of the Examples and Comparative Examples, the surgical optical lens according to the present invention is a polarized lens of which the average transmittance in the visible light wavelength range is 40% or more, and contains a specific wavelength absorbing pigment such that the ratio of the minimum transmittance in the wavelength range of 580 to 600 nm to the average transmittance in the visible light wavelength range, i.e., 380 to 780 nm is from 18 to 50%, so that such a lens has contrast characteristics that enables easy detection of blood that has leaked out of blood vessels into the body tissue.

INDUSTRIAL APPLICABILITY

This invention is applicable to surgical optical lenses usable during surgery performed on humans or animals for the purpose of treatment, diagnosis or examination, for example, to lenses for medical use, including a surgical spectacle lens used to observe a body tissue such as an organ or an eye, a lens for a surgical microscope (loupe), and a lens for an endoscope such as a gastric camera.

What is claimed is:

1. A surgical optical lens which is a polarized lens comprising a lens base and a polarizing filter integral with the lens base, wherein an average transmittance of the polarized lens in a visible light wavelength range of 380 to 780 nm is 40% or more, and wherein either the lens base or any layer that is integral with the lens base contains a specific wavelength light absorbing pigment such that a ratio of a minimum transmittance in a wavelength range of 580 to 600 nm to the average transmittance in the visible light wavelength range of 380 to 780 nm is 18 to 50%.

2. The surgical optical lens recited in claim 1, wherein the polarized lens is a polarized lens having a degree of polarization of 15 to 40%.

3. The surgical optical lens recited in claim 2, wherein the average transmittance in the visible light wavelength range of 380 to 780 nm is 45 to 75%.

4. The surgical optical lens recited in claim 2, wherein the specific wavelength light absorbing pigment is a tetraazaporphyrin compound.

5. A surgical spectacle lens which is the surgical optical lens recited in claim 2.

6. The surgical optical lens recited in claim 1, wherein the average transmittance in the visible light wavelength range of 380 to 780 nm is 45 to 75%.

7. The surgical optical lens recited in claim 6, wherein the specific wavelength light absorbing pigment is a tetraazaporphyrin compound.

8. A surgical spectacle lens which is the surgical optical lens recited in claim 6.

9. The surgical optical lens recited in claim 1, wherein the specific wavelength light absorbing pigment is a tetraazaporphyrin compound.

10. The surgical optical lens recited in claim 9, wherein the polarizing filter is a polarizing filter that is dyed blue-purple, purple, or red purple.

11. A surgical spectacle lens which is the surgical optical lens recited in claim 9.

12. The surgical optical lens recited in claim 1, wherein the polarizing filter is a polarizing filter that is dyed blue-purple, purple, or red purple.

13. A surgical spectacle lens which is the surgical optical lens recited in claim 12.

14. A surgical spectacle lens which is the surgical optical lens recited in claim 1.

\* \* \* \* \*